(12) United States Patent
Hayashi

(10) Patent No.: US 7,095,534 B2
(45) Date of Patent: Aug. 22, 2006

(54) METHOD AND DEVICE FOR POSITIONING OF PLATEN GLASS OF IMAGE READER

(75) Inventor: Eiichi Hayashi, Saitama (JP)

(73) Assignee: Fujinon Corporation, (JP)

( * ) Notice: Subject to any disclaimer, the term of this patent is extended or adjusted under 35 U.S.C. 154(b) by 934 days.

(21) Appl. No.: 10/106,175

(22) Filed: Mar. 26, 2002

(65) Prior Publication Data

US 2002/0140999 A1    Oct. 3, 2002

(30) Foreign Application Priority Data

Mar. 30, 2001   (JP)   ............................. 2001-102633

(51) Int. Cl.
  *H04N 1/04*   (2006.01)
(52) U.S. Cl. .................. 358/474; 358/498; 399/361; 399/377; 399/365
(58) Field of Classification Search ................ 358/474, 358/498; 399/361, 377, 365
  See application file for complete search history.

(56) References Cited

U.S. PATENT DOCUMENTS 4,616,796 A * 10/1986 Inoue ...................... 248/206.5
5,227,846 A * 7/1993 Leonard et al. ............. 399/213
5,338,018 A * 8/1994 Nagao et al. ............... 271/3.05

FOREIGN PATENT DOCUMENTS

JP          11057673         3/1999

* cited by examiner

*Primary Examiner*—Douglas Q. Tran
*Assistant Examiner*—Negussie Worku
(74) *Attorney, Agent, or Firm*—Price, Heneveld, Cooper, DeWitt & Litton, LLP

(57) ABSTRACT

A method and mechanism to set a platen glass of an image reader by demounting the platen glass after the platen glass has previously been position-adjusted and positioning means have been fixed to this adjusted position and then achieving the desired positioning by these positioning means before the platen glass is mounted again on the image reader. Upon completion of optical adjustment, the platen glass is temporarily fixed to a casing of the image reader and then the platen glass is position-adjusted until image data formed on a test chart sheet coincide with predetermined image data. After the adjustment, positioning blocks are secured to top-plates of the casing and a glass retaining plate is secured to these top-plates. Subsequently, the platen glass may be mounted on the image reader in operative association with these positioning blocks to set the platen glass to the adjusted position.

6 Claims, 9 Drawing Sheets

METHOD AND DEVICE FOR POSITIONING OF PLATEN GLASS OF IMAGE READER

BACKGROUND OF THE INVENTION

1. Field of the Invention

The present invention relates to an image reader for a stationary original placed on a platen glass irradiated with light beams emitted from a light source lamp for reading an image recorded on the original on the basis of light beams reflected from the original and particularly to a mechanism for positioning the platen glass of such an image reader.

2. Description of the Related Art

An image reader such as copying machine or scanner adapted to read an original image data recorded on paper sheet or the like for subsequent various kinds of processing is generally constructed so that the original is irradiated with light beams emitted from a light source lamp such as fluorescent lamp. Light beams reflected on the original are guided to enter a light receiving station provided with a photoelectric converter device such as CCD (Charge-Coupled Device). In the case of the image reader for a stationary original, the original is placed on the platen glass and is irradiated with light beams emitted from said light source lamp which is moved relative to said original. Not only the light source lamp but also a reflector and the other components adapted to guide the light beams reflected on the original to the light receiving station must be moved along the original in order to maintain a optical path length from the original to the light receiving station even when the position at which the original is irradiated with the light beams varies.

The position from which the light source lamp, the reflector and the other components start to move is constant independent of various factors including the size of the original. Unless the original placed on the platen glass is set to a predetermined position, the position from which the image recorded on said original starts to be read will not coincide with the end position of the image and it may become impossible for the image reader to read the image recorded on the entire area of the original. If the original is oriented out of alignment with the predetermined direction in which the light source lamp, the reflector and the other components move, a correspondingly misaligned image will be picked up. In order to ensure that the image can be read starting from the end of the original and the original is properly aligned with said predetermined direction, it is essential to set the original to the predetermined position on the platen glass.

Conventionally, a structure provided with a guide member against which an end of the original is placed as the original is placed on the platen glass has been used for positioning of the original and such positioning guide for the original is described, for example, in Japanese Laid-Open Patent Application Gazette No. 2000-258857. The positioning guide for the original comprises a narrow plate-like member having a datum edge against which the end of the original is placed and a mounting projection formed along the other edge of said narrow plate-like member. The mounting projection is formed with threaded holes, U-shaped notches and tapered regions, on one hand, and a top opening of the image reader's frame is formed along its peripheral edge with threaded holes in alignment with the threaded holes of said mounting piece and projections adapted to seat in the respective U-shaped notches, on the other hand. The tapered regions communicate with the U-shaped depressions and have inner diameters gradually enlarged as these tapered regions go away from the U-shaped depressions. The platen glass (contact glass) on which the original is placed is mounted on the image reader so that one end of said platen glass overlaps said datum edge of said narrow plate-like member.

When the image recorded on the original is read by the image reader provided with such positioning guide for the original, the original is set by placing its one end against the datum edge of said narrow plate-like member.

With the positioning guide for the original described in the above-cited Japanese Laid-Open Patent Application Gazette No. 2000-258857, the projections formed on the image reader's frame are engaged in the U-shaped notches to achieve positioning of said narrow plate-like member. However, these projections are formed on the image reader's frame and therefore may raise problems as follow. As has previously been described above, the position to which the original is set depends on the position from which the light source lamp, the reflector and the other components start to move. In order to set this position from which the components such as the light source lamp and the reflector start to move at high accuracy, the image reader's frame and the other components must be installed at correspondingly high precision. In consequence, the cost for installing them correspondingly increases. To avoid this, the end of the original as well as the position from which said components start to move has practically been adjusted basically by adjusting the position to which the original should be set. In other words, such positioning guide of the original of prior art has usually made a certain allowance for the setting accuracy of the position from which said components should start to move. In order that such adjustment can be effectively carried out, a certain play must be defined between said projections of the image reader's frame and the associated U-shaped notches. As a result, when the platen glass and the positioning guide for the original having been demounted once are installed again, the position at which said positioning guide of the original is fixed must be adjusted again with much labor and time.

SUMMARY OF THE INVENTION

In view of the problems as have been described above, the present invention aims to provide a method and mechanism for positioning a platen glass of an image reader improved so that, even when the platen glass and the positioning guide for the original are demounted and installed again, reassembly can be easily achieved at a high accuracy without troublesome adjustment of positions at which various components such as the positioning guide for the original should be fixed.

The object set forth above is achieved, according to one aspect of the present invention, by a method for positioning a platen glass at a predetermined position in an image reader adapted to irradiate an original placed on said platen glass with light beams from a light source lamp, to pick up light beams reflected on the original and thereby to read an image formed on said original. The method comprises the steps of: mounting guide means on the surface of said platen glass so as to guide the position of said original; operatively associating one end of said platen glass with glass retaining means adapted to fix said platen glass to said image reader and simultaneously to guide the position of said original; mounting said platen glass on said image reader and actuating said image reader to read an image formed on a predetermined original positioned in a predetermined manner; adjustably shifting said platen glass to acquire image data from said predetermined original; securing positioning means adapted to be selectively engaged with or disengaged from the other end of said platen glass to said image reader at the position allowing said predetermined image data to be acquired; and placing said platen glass against said positioning means by said glass retaining means and thereby positioning said platen glass.

Upon completion of optical adjustment for the image reader, the platen glass is mounted on said image reader with said glass retaining means adapted to retain said platen glass being temporarily fixed to said image reader. Under guiding effect of said guide means and glass retaining means, a predetermined original such as a test chart sheet is placed on said platen glass. Image data is acquired from this original and compared to the predetermined image data. The platen glass is adjustably shifted until the acquired image data substantially coincides with the predetermined image data and thereby the original is position-adjusted. At the position ensuring the predetermined image data to be obtained, said positioning means are fixed to the image reader. At the same time, the glass retaining means retaining the platen glass is fixed to the image reader so as to place the platen glass against the positioning means. In this state, the platen glass is proper positioned with respect to the image reader to acquire the predetermined image data.

When it is desired to demount the platen glass for the purpose of repair or maintenance, said glass retaining means may be demounted from the image reader to demount the platen glass. To mount the platen glass again, said glass retaining means may be fixed to the image reader with the platen glass operatively associated with said positioning means to set the platen glass to the same position as before the platen glass has been demounted. In this way, the predetermined image data can be acquired also after remounting of the platen glass.

The object set forth above is achieved, according the other aspect of the present invention, by a mechanism for positioning a platen glass at a predetermined position in an image reader adapted to irradiate an original placed on said platen glass with light beams from a light source lamp, to pick up light beams reflected on the original and thereby to read an image formed on said original. The mechanism comprising: guide means mounted on the surface of said platen glass to guide the position of said original; a glass retainer operatively associated with one end of said platen glass to fix said platen glass to said image reader and simultaneously to guide the position of said original; and a positioning means fixed to the image reader and adapted to be selectively engaged with or disengaged from the other end of said platen glass to set said platen glass to a predetermined position. When a predetermined original is placed on said platen glass at a predetermined position and said platen glass is adjustably shifted until a predetermined image data can be acquired from said predetermined original whereupon said positioning means are fixed to said image reader and said glass retainer is used to retain said platen glass on said image reader and simultaneously to place said platen glass against said positioning means.

The glass retainer retaining the platen glass is temporarily fixed, for example, by appropriately tightening set screws or the like, to the image reader of which the optical adjustment has already been completed. The predetermined original such as a test chart sheet its placed on the platen glass under the guiding effect by said guide and said glass retainer. The platen glass is adjustably shifted until the acquired image data substantially coincides with the predetermined image data whereupon said positioning means are fixed to the image reader. Said glass retainer is fixed by set screws or the like to the image reader so as to place the platen glass against said fixed positioning means. In this way, the platen glass is set to the desired position and thereafter the original may be placed on the platen glass under the guiding effect by said guide means to acquire the desired image data.

The platen glass can be demounted e.g. for the purpose of repair by demounting the glass retaining plate. To mount again the platen glass, said glass retainer may be fixed to the image reader with the platen glass operatively associated with said positioning means to ensure that the platen glass is set the same position as before it has been demounted and thereafter also the predetermined image data can be acquired.

According to one preferred embodiment of the mechanism for positioning the platen glass of the image reader, said positioning means are substantially L-shaped so that corners of said platen glass may be placed against L-shaped inner sides of the respective positioning means.

To associate the platen glass operatively with the positioning means, the corners of said platen glass are placed against the substantially L-shaped inner sides of the respective positioning means so that two sides of the platen glass are controlled by two sides defined by each L-shaped inner side and the platen glass is consistently positioned.

According to another preferred embodiment of the mechanism for positioning the platen glass of the image reader, said platen glass mounted on said image reader is provided with an auxiliary positioning means adapted to be operatively associated with one side edge of said platen glass.

The platen glass is three-point positioned by said positioning means and said auxiliary positioning means.

According to still another preferred embodiment of the mechanism for positioning the platen glass of the image reader, a guide is adhesively attached to the surface of said platen glass. The guide may be adhesively attached to the surface of the platen glass using adhesive, double bond tape or the like.

The method and the mechanism according to the present invention for positioning the platen glass of the image reader will be more fully understood from the description of preferred embodiments given hereunder in reference with the accompanying drawings.

DETAILED DESCRIPTION OF THE EMBODIMENTS

Figure 9:
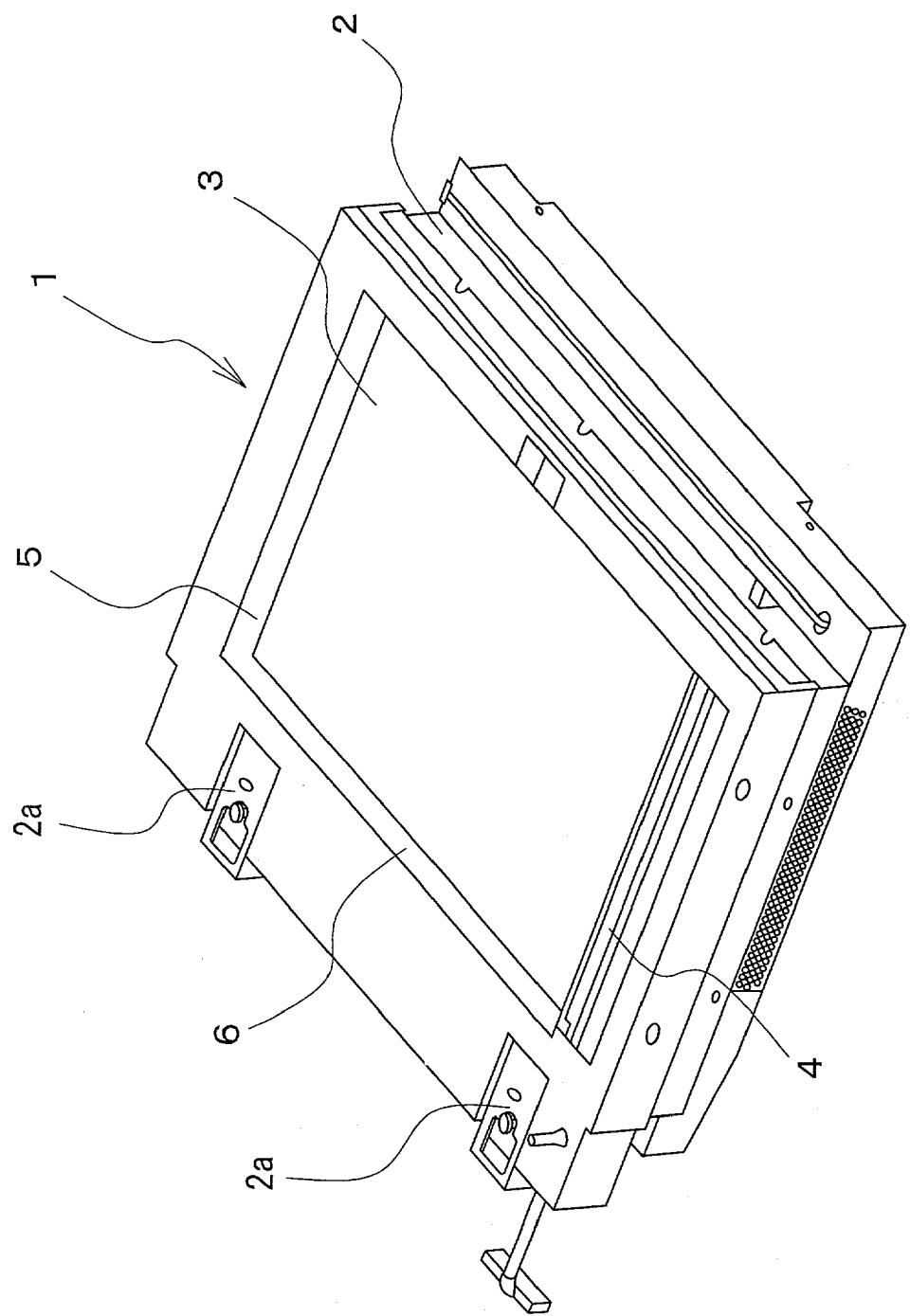
FIG. 9 is a perspective view schematically showing an image reader suitable to be provided with the platen glass positioning mechanism according to the present invention.

FIG. 9 is a perspective view schematically showing a casing 2 of an image reader 1 suitable to be provided with a platen glass positioning mechanism according to the present invention. The image reader 1 comprises the casing 2 containing therein, though not shown, a carriage, a drive mechanism for the carriage and the other conventional components. A platen glass 3 is placed upon and mounted on a top of the casing 2. On one side of this platen glass 3, there is provided a reader platen glass 4 exclusively used to read an image on original being fed. A lid (not shown) is pivotally mounted on this casing 2 so as to cover the platen glass 3 as well as the platen glass 4 and the casing 2 is provided with hinge seats 2a for the hinges allowing the lid to be pivotally opened or closed.

Figure 1:
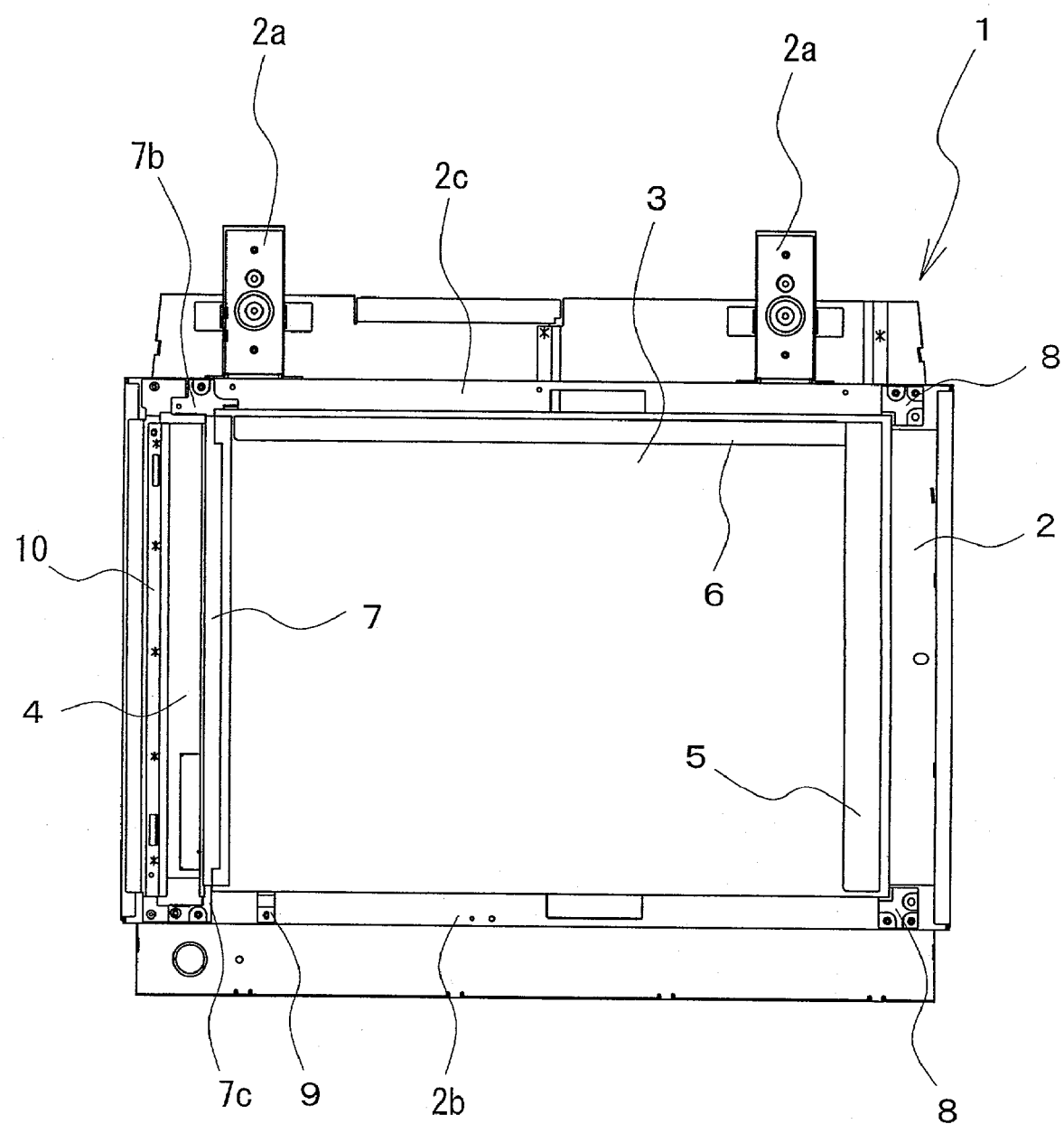
FIG. 1 is a plan view showing an image reader provided with a platen glass positioning mechanism according to the present invention.
Figure 2:
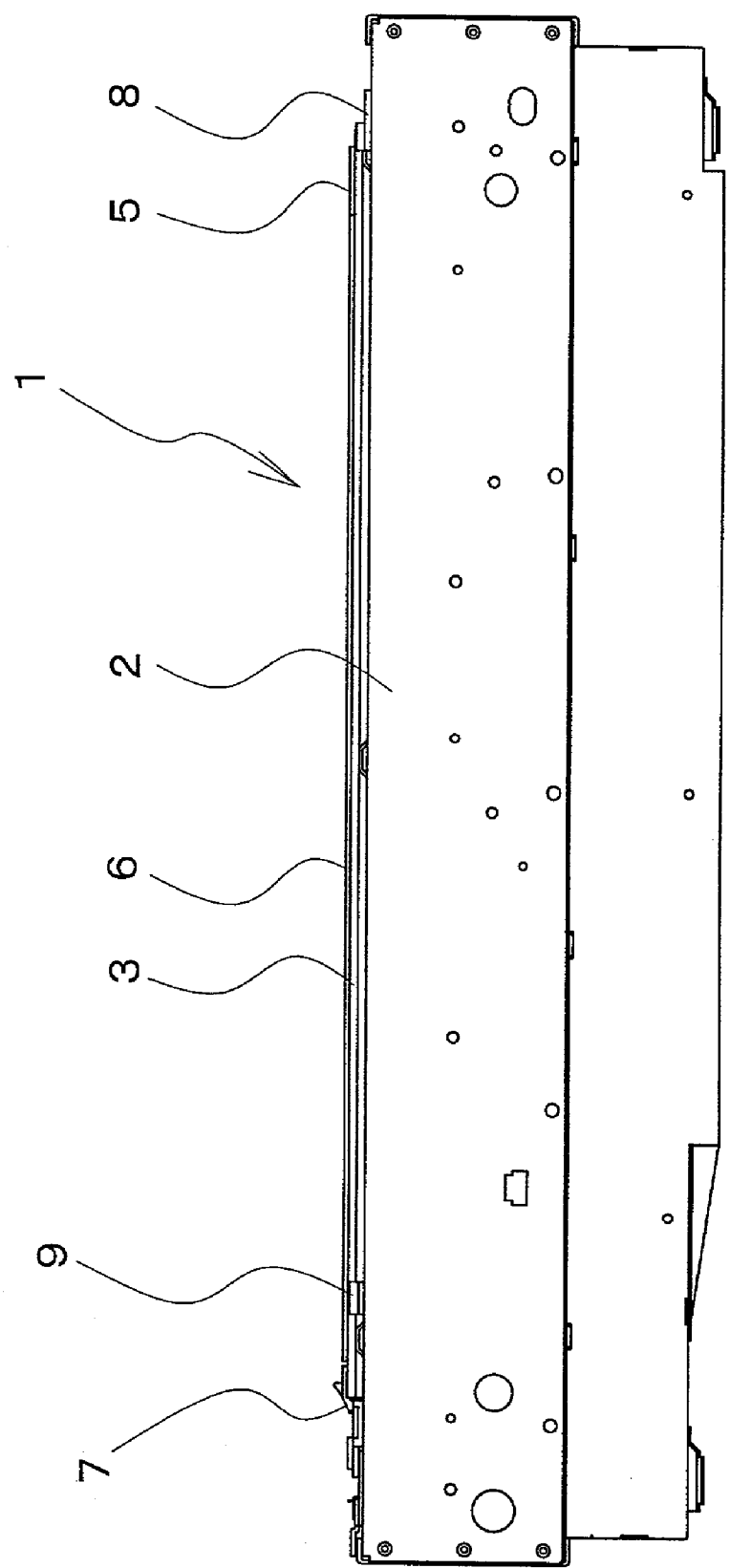
FIG. 2 is a front view of the image reader shown in FIG. 1.
Figure 3:
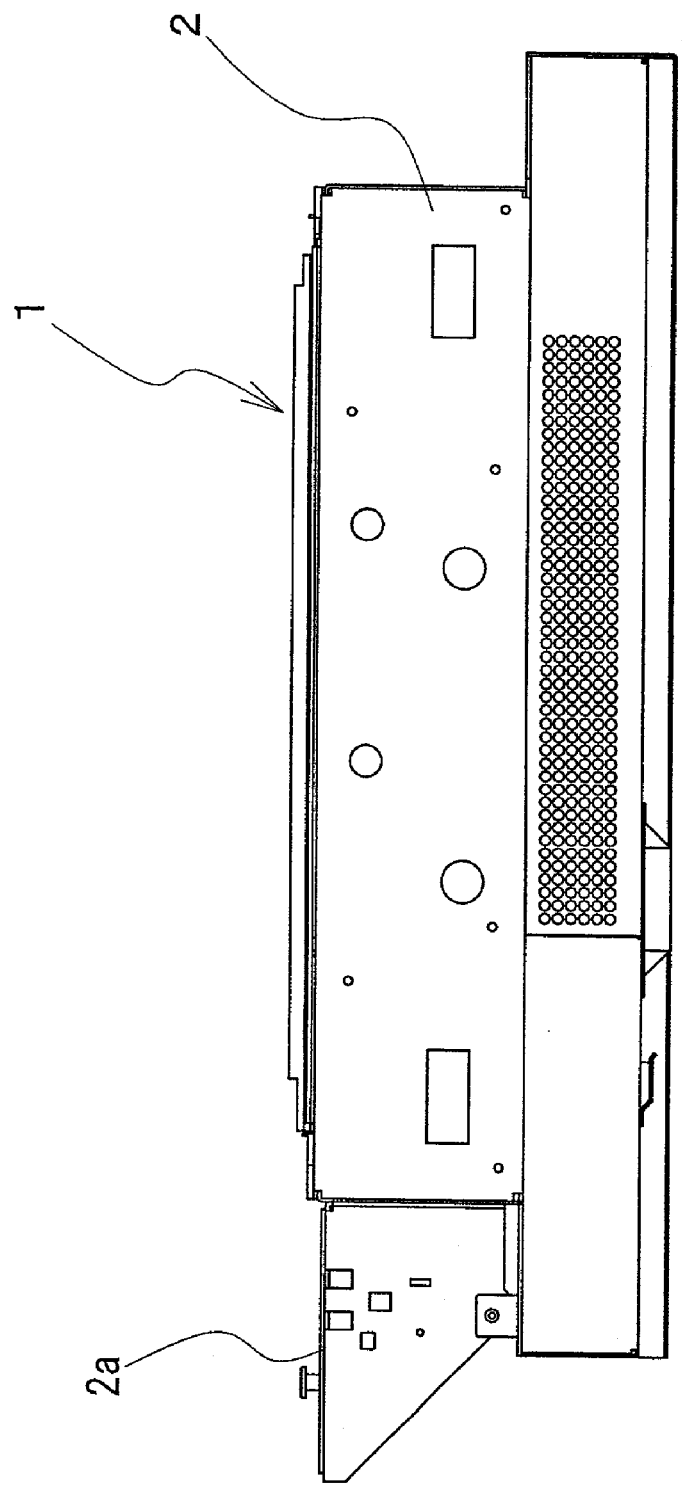
FIG. 3 is a left side view of the image reader shown in FIG. 1.
Figure 4:
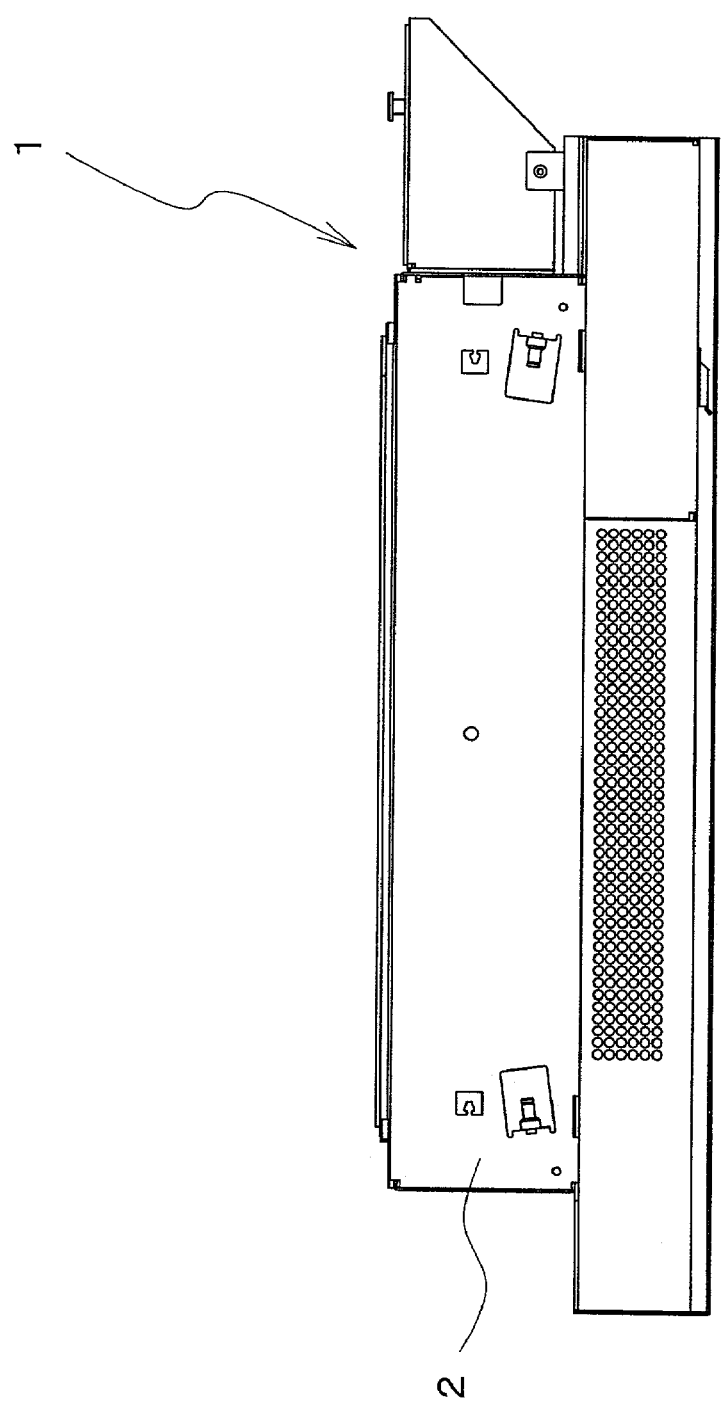
FIG. 4 is a right side view of the image reader shown in FIG. 1.
Figure 5:
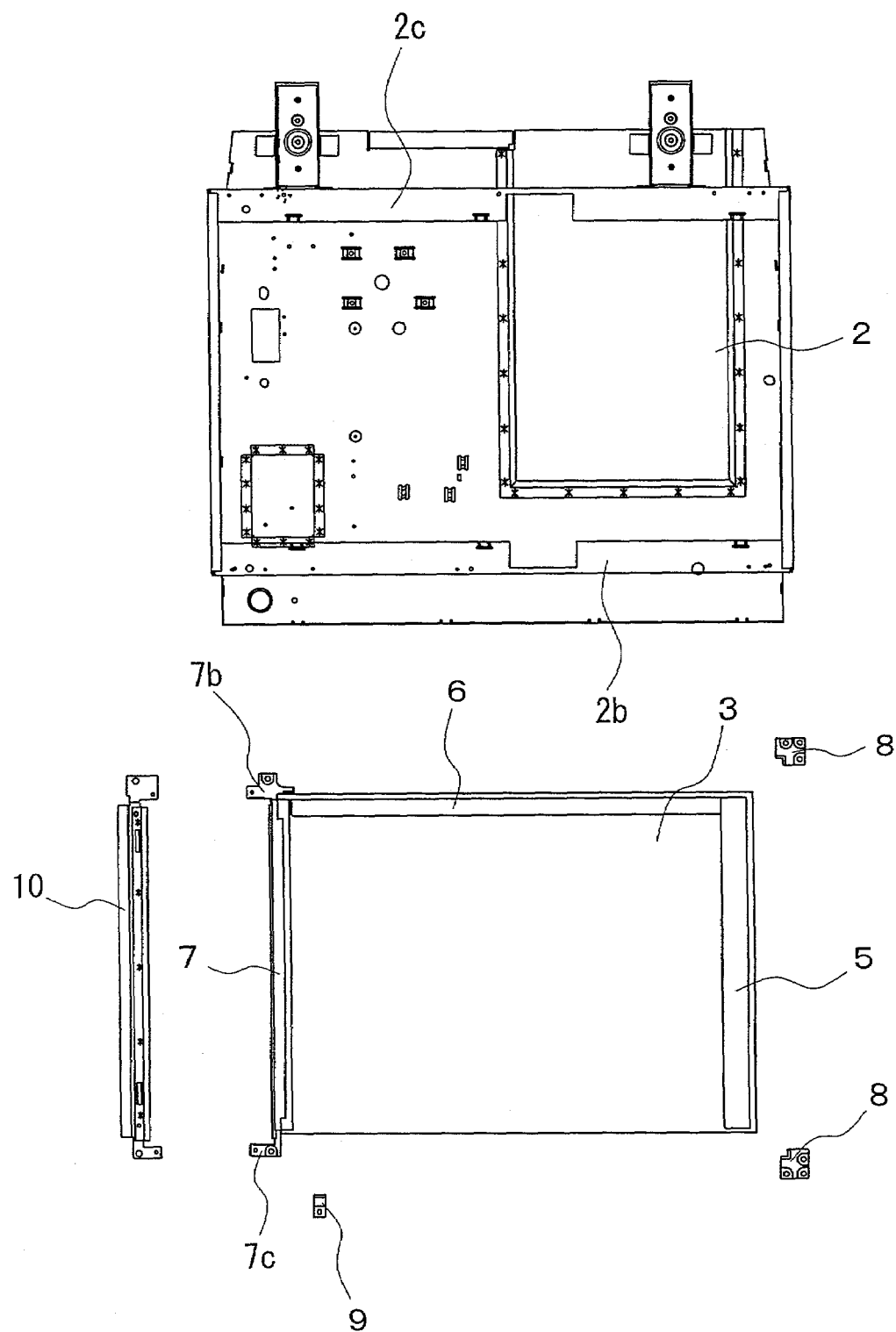
FIG. 5 is an exploded plan view showing a casing and a platen glass.

FIG. 1 is a plan view showing the image reader 1 incorporating the present invention. It has a casing 2 having the platen glass 3 mounted thereon, FIGS. 2, 3 and 4 are front, left and right side views of the image reader 1. The casing 2 has a top opening and the platen glass 3 is mounted on the casing 2 so as to close this opening. FIG. 5 is an exploded plan view showing the casing 2 and the platen glass 3. The casing 2 is provided on its top with front and rear top-plates 2b, 2c and the platen glass 3 is mounted on the casing 2 so as to be placed upon these top-plates 2b, 2c.

Figure 6:
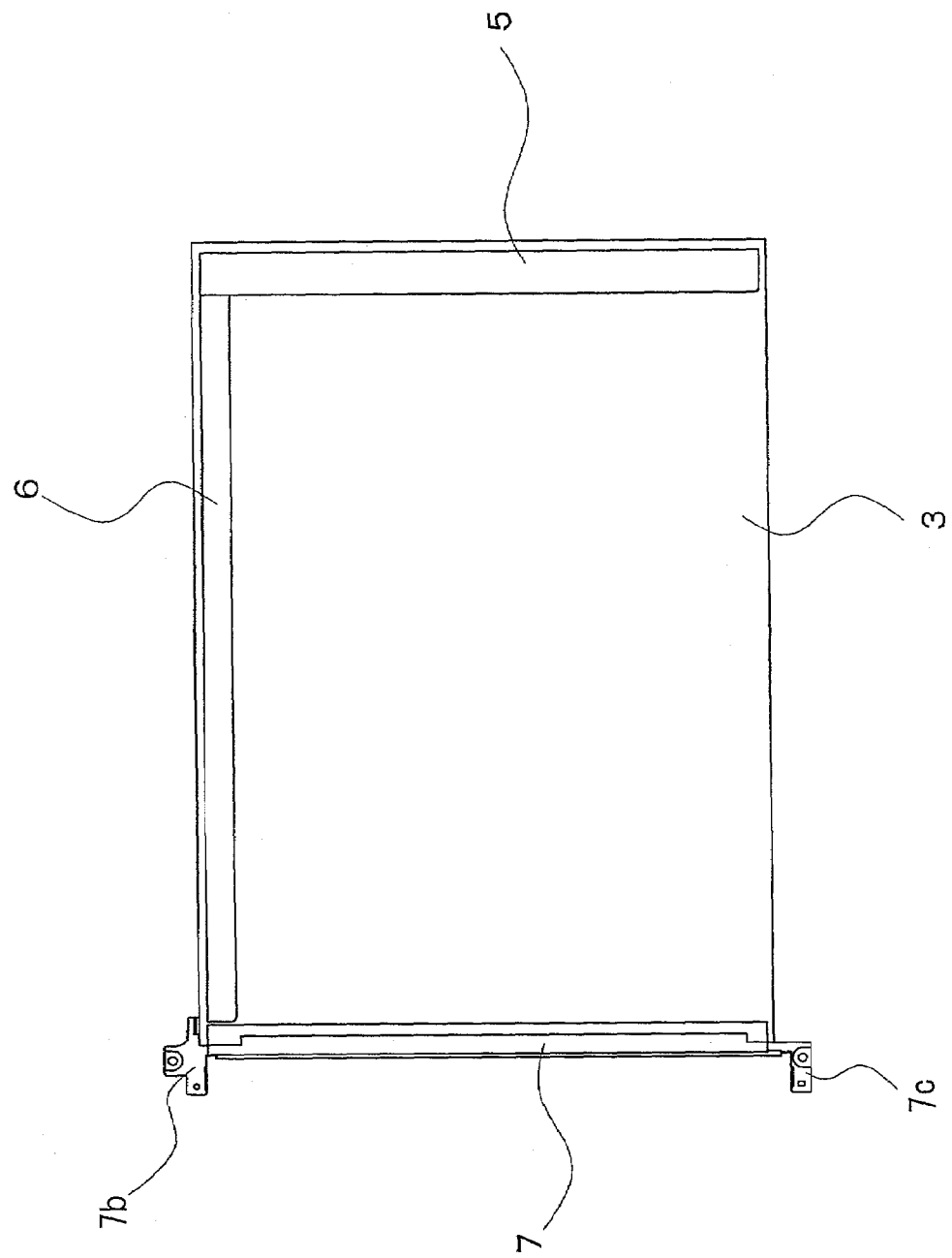
FIG. 6 is a plan view showing the platen glass as provided with a guide and a glass retaining plate.
Figure 7:
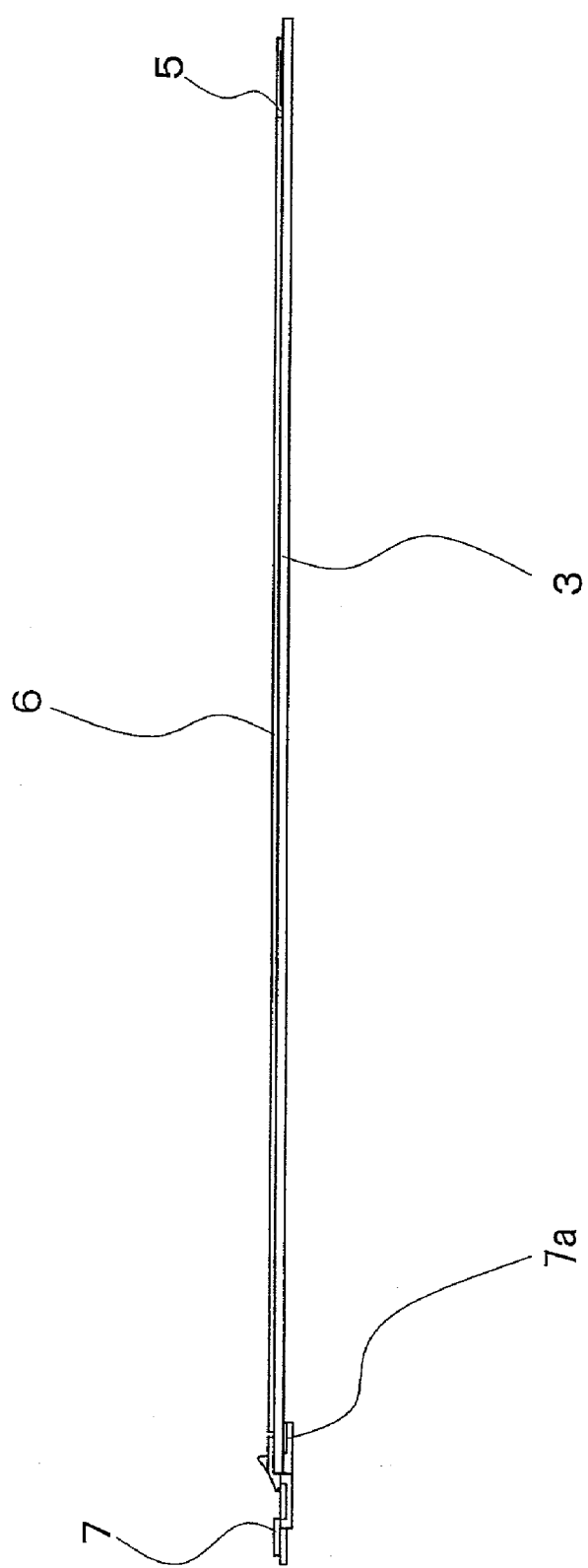
FIG. 7 is a front view of the platen glass shown in FIG. 6.
Figure 8:
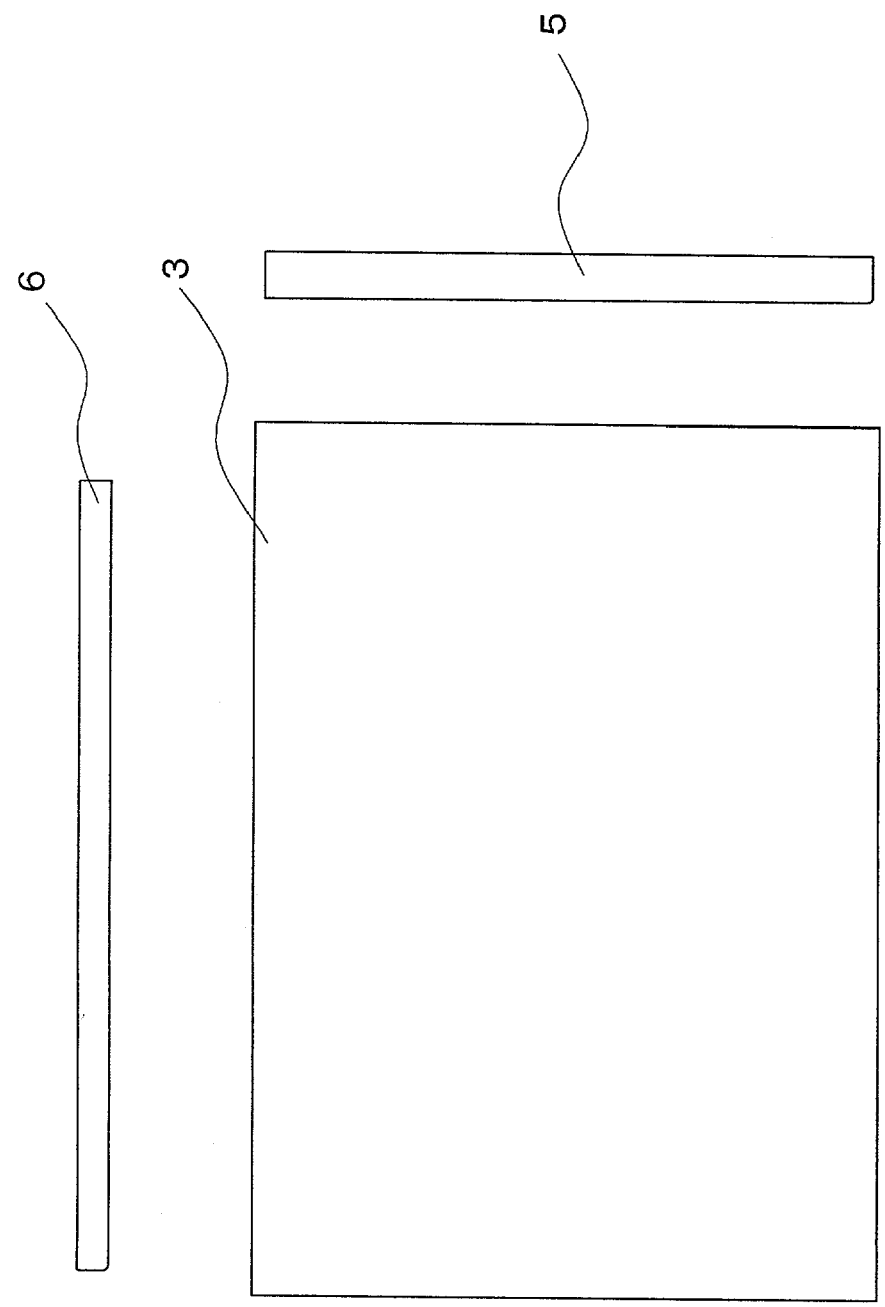
FIG. 8 is an exploded plan view showing the platen glass, the guide and the glass retaining plate.

As best seen in FIGS. 6 and 7, a guide plate 6 serving as guide means and a control plate 5 are attached to the platen glass 3 using adhesive or double bond tape. Both the control plate 5 and the guide plate 6 are provided in the form of thin band-like plates. The control plate 5 and the guide plate 6 respectively extend in transverse and longitudinal directions of the platen glass 3 and are respectively bonded to said platen glass 3 along a peripheral edge thereof. It should be understood that these control and guide plates 5, 6 are bonded to the platen glass 3 slightly inside its peripheral edge.

The platen glass 3 is further provided along its one end opposed to its end along which said control plate 5 is mounted with a glass retaining plate 7 serving as glass retaining means. As best seen in FIG. 7, this glass retaining plate 7 has a retaining pawl 7a adapted to be inserted under the platen glass 7 and thereby to support the platen glass 3. The glass retaining plate 7 is formed at its longitudinally opposite ends with mounting regions 7b, 7c and mounted on the casing 2 with the mounting regions 7b, 7c placed upon the front and rear top-plates 2c, 2b, respectively. The glass retaining plate 7 has its end surface facing the platen glass 3 is shaped so that, upon coming in contact with this end surface, the original may be properly guided and positioned.

As will be understood from FIGS. 1 and 5, a pair of positioning blocks 8 serving as positioning means are provided in the vicinity of corners of the platen glass 3 mounted on the casing 2. These corners respectively lie adjacent longitudinally opposite ends of the control plate 5 and these positioning blocks 8 are secured to the top-plates 2b, 2c of the casing 2 by means of screws, respectively. These positioning blocks 8 are substantially L-shaped and the respective corners of the platen glass 3 are placed closely against the L-shaped inner sides of the respective positioning blocks 8. At a position toward the end of the platen glass 3 adjacent glass retaining plate 7, an auxiliary positioning block 9 is secured to the front top-plate 2b by means of a screw so that this auxiliary positioning block 9 may be kept in contact with the side edge of the platen glass 3 opposite guide plate 6.

As seen in FIG. 1, the platen glass 4 exclusively used to read the image on the original being fed is opposed to the platen glass 3 with the glass retaining plate 7 therebetween and has its one end fixed by the glass retaining plate 7. This platen glass 4 has its other end placed on a glass retaining plate 10 which is, in turn, mounted on the end of the casing 2.

The method according to the present invention for positioning the platen glass of the image reader will be described together with a manner in which the above-described embodiment of the mechanism according to the present invention operates.

As will be best seen in FIGS. 6 and 7, the control plate 5 and the guide plate 6 are attached to the platen glass 3 by means of adhesive or double bond tape so that these control plate 5 and guide plate 6 may extend substantially in parallel to the associated end and edge, respectively, and may be substantially orthogonal to each other. The glass retaining plate 7 is mounted on the end of the platen glass 3 which is opposed to its end on which the control plate 5 is mounted. The platen glass 3 provided with the control plate 5 and glass retaining plate 7 in this manner is then placed on the top-plates 2b, 2c of the casing 2 and the set screws are inserted through the mounting regions 7b, 7c for the glass retaining plate 7. In this way, the platen glass 3 is temporarily positioned. It should be understood that various components such as the carriage and the photoelectric converter device have already been mounted within the casing 2 and optical adjustment of these components also have already been completed.

Now a test chart sheet is placed on the platen glass 3 mounted on the casing 2 with two sides of the sheet held in contact with the guide plate 6 and the glass retaining plate 7, respectively, in order to acquire image data of this test chart. The image data acquired in this manner is compared to a predetermined image data and the platen glass 3 is adjustably shifted until the acquired image data substantially coincide with the predetermined image data.

Confirming that the acquired image data substantially coincide with the predetermined image data, the glass retaining plate 7 which has been temporarily positioned is secured.

Then, the positioning blocks 8 are secured by the set screws to the top-plates 2b, 2c, respectively, with the L-shaped inner sides of these blocks 8 placed against the associated corners of the platen glass 3. Similarly, the auxiliary positioning block 9 is secured to the front top-plate 2b in contact with the associated side edge of the platen glass 3. In this way, the platen glass 3 is properly positioned and thereby it is ensured that the image data corresponding to the predetermined image data can be obtained.

The platen glass 3 can be demounted e.g. for the purpose of repair by demounting the glass retaining plate 7. To again mount the platen glass 3 having been demounted in this manner at the same position as before it has been demounted, the corners of the platen glass 3 on the side along which the control plate 5 is mounted are positioned in contact with the L-shaped inner sides of the associated positioning blocks 8 and then the glass retaining plate 7 is mounted so as to place the platen glass 3 against the respective positioning blocks 8. Also for exchange of the damaged platen glass 3 with a fresh one, the positioning blocks 8 ensures this fresh platen glass 3 to be properly positioned so that the original can be properly placed to obtain the proper image data.

As will be apparent from the foregoing description, the method or the mechanism according to the present invention for positioning of the platen glass in the image reader advantageously eliminates a demand for position-adjustment of the platen glass after mounting thereof. This is for the reason that the platen glass having been demounted for some purposes can be mounted again accurately at the same position as before it has been demounted. In this way, repair or maintenance of the image reader can be easily and rapidly carried out.

The platen glass positioning mechanism in the image reader according to the present invention, in which the positioning means are substantially L-shaped so that the corners of the platen glass may be placed in contact with the L-shaped inner sides of the respective positioning means, advantageously simplifies the operation of mounting the platen glass. This is for the reason that the platen glass can be properly positioned merely by inserting the corners of the platen glass into the L-shaped inner sides of the respective positioning means.

The platen glass positioning mechanism in the image reader according to the present invention, in which there is provided the auxiliary positioning means operatively associated with the one side edge of the platen glass, advantageously enables the platen glass to be more reliably positioned by three point positioning. The platen glass positioning mechanism in the image reader according to the present invention, in which the guide plate is adhesively bonded to the surface of the platen glass, advantageously simplifies the operation of mounting the guide plate on the platen glass.

It will become apparent to those skilled in the art that various modifications to the preferred embodiment of the invention as described herein can be made without departing from the spirit or scope of the invention as defined by the appended claims.

What is claimed is:

1. A method for positioning a platen glass at a predetermined horizontal position on the casing of an image reader adapted to irradiate an original placed on said platen glass with light beams from a light source lamp, to pick up light beams reflected on the original and thereby to read an image formed on said original, said method comprising steps of:

mounting guide plates on the surface of a platen glass so as to guide the horizontal position of an original to be copied;

operatively associating one end of the platen glass with a glass retainer adapted to fix the platen glass to the image reader and simultaneously to guide the position of the original;

mounting the platen glass on the image reader and actuating said image reader to read an image formed on a predetermined original positioned in a predetermined manner in relation to the guide plates;

adjustably shifting said platen glass in a horizontal plane to acquire image data from said predetermined original which corresponds to the data on the predetermined original;

securing the platen glass with horizontal positioning blocks selectively engaging the other end of the platen glass to the image reader at the position allowing said predetermined image data to be acquired; and placing said platen glass against said positioning blocks by said glass retainer and securing the retainer to the casing of the image reader, thereby accurately positioning said platen glass.

2. A mechanism for positioning a platen glass at a predetermined position on an image reader adapted to irradiate an original placed on said platen glass with light beams from a light source lamp, to pick up light beams reflected on the original and thereby to read an image formed on said original, said mechanism comprising:

a platen glass;

guide plates mounted on the surface of said platen glass to guide the position of an original to be copied;

a glass retainer operatively associated with one end of said platen glass and adapted to fix said platen glass to the casing of an image reader and simultaneously guide the position of the original; and positioning means fixed to the image reader and adapted to be selectively engaged with or disengaged from an end of said platen glass opposite said glass retainer to set said platen glass to a predetermined position, wherein when a predetermined original is placed on said platen glass at a predetermined position and said platen glass is adjustably shifted on the casing until a predetermined image data can be acquired from said predetermined original whereupon said positioning means are fixed to said image reader and said glass retainer is used to retain said platen glass on said image reader and simultaneously to place said platen glass against said positioning means.

3. The mechanism for positioning the platen glass of the image reader according to claim 2, wherein said positioning means are substantially L-shaped plates having inner sides so that corners of said platen glass may be placed against said L-shaped inner sides of said positioning means.

4. The mechanism for positioning the platen glass of the image reader according to claim 3, wherein said platen glass mounted on said image reader is provided with an auxiliary positioning device adapted to be operatively associated with one side edge of said platen glass.

5. The mechanism for positioning the platen glass of the image reader according to claim 2, wherein said guide plates are adhesively attached to the surface of said platen glass.

6. The mechanism for positioning the platen glass of the image reader according to claim 3, wherein said guide plates are adhesively attached to the surface of said platen glass.

* * * * *